(12) United States Patent
McMiles

(10) Patent No.: US 7,726,405 B2
(45) Date of Patent: Jun. 1, 2010

(54) HIGH PRESSURE LARGE BORE UTILITY LINE CONNECTOR ASSEMBLY

(76) Inventor: Barry James McMiles, 22402 Park Point Dr., Katy, TX (US) 77450

( * ) Notice: Subject to any disclaimer, the term of this patent is extended or adjusted under 35 U.S.C. 154(b) by 50 days.

(21) Appl. No.: 11/895,692

(22) Filed: Aug. 27, 2007

(65) Prior Publication Data

US 2008/0047714 A1 Feb. 28, 2008

Related U.S. Application Data

(60) Provisional application No. 60/840,558, filed on Aug. 28, 2006.

(51) Int. Cl.
*E21B 43/01* (2006.01)
(52) U.S. Cl. .................. 166/344; 166/339; 166/347; 166/367; 166/85.4; 166/88.4
(58) Field of Classification Search ................. 166/344, 166/339, 345, 367, 347, 88.4, 85.4
See application file for complete search history.

(56) References Cited

U.S. PATENT DOCUMENTS

| | | | | |
|---|---|---|---|---|
| 5,398,761 A | * | 3/1995 | Reynolds et al. ............ 166/344 |
| 5,558,532 A | * | 9/1996 | Hopper ........................ 439/310 |
| 5,697,732 A | * | 12/1997 | Sigmundstad ................ 405/169 |
| 5,895,077 A | * | 4/1999 | Sigmundstad ................. 285/96 |
| 6,009,950 A | * | 1/2000 | Cunningham et al. ........ 166/344 |
| 6,089,321 A | * | 7/2000 | Morrill ........................ 166/341 |
| 6,293,345 B1 | * | 9/2001 | Watkins ....................... 166/368 |
| 6,679,472 B2 | * | 1/2004 | Baugh .......................... 251/62 |
| 7,395,866 B2 | * | 7/2008 | Milberger et al. ........... 166/345 |

* cited by examiner

*Primary Examiner*—Thomas A Beach
*Assistant Examiner*—Matthew R Buck

(57) ABSTRACT

A utility line connector assembly having a male stab having a central bore with a port that communicates with a second bore in a receptacle where the stab is fixedly inserted into a receiving female opening in the receptacle, the receptacle has an L shaped opening with a protruding partial spherical pocket, a ring groove for sealing said stab to a riser package, and where the stab and receptacle are placed between a lower marine riser and the blow out preventer in fluid communication therebetween. The stab and receptacle may be sealed with ring seals and the assembly may be used in riser auxiliary line connections, sub sea production tree connections, drape hose connections and surface bop auxiliary line connections.

11 Claims, 3 Drawing Sheets

HIGH PRESSURE LARGE BORE UTILITY LINE CONNECTOR ASSEMBLY

CROSS REFERENCE TO RELATED APPLICATIONS

The present application is related to the following U.S. patent application: provisional patent application No. 60/840,558 titled "Choke and Kill Lines Connector Assembly" filed on Aug. 28, 2006 which is hereby incorporated by reference as if fully set forth herein.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of undersea blowout protector valves and more specifically to a high pressure large bore utility line connector assembly. It can also be utilized in a variety of applications including, but not limited to, riser auxiliary line connections, sub sea production tree connections, drape hose connections, and surface blow out preventer auxiliary line connections.

A blowout preventer (BOP) is a large valve at the top of an oil well that may be closed if the drilling crew loses control of formation fluids. By closing this valve (usually operated remotely via hydraulic actuators), the drilling crew usually regains control of the oil reservoir by pumping through the well and controlling the wellbore pressure through the choke line, and procedures can then be initiated to increase the mud density until it is possible to open the BOP and retain pressure control of the formation.

In extraordinary cases it may be necessary to force the wellbore influx back into the formation by pumping down the kill line. BOPs come in a variety of styles, sizes and pressure ratings. Some can effectively close over an open wellbore, some are designed to seal around tubular components in the well (drillpipe, casing or tubing) and others are fitted with hardened steel shearing surfaces that can actually cut through drillpipe. In an undersea application, the lower marine riser package is the pipe between a seabed BOP and a floating drilling rig.

BRIEF SUMMARY OF THE INVENTION

The primary advantage of the invention is to provide a high pressure large bore utility line connector assembly.

Another advantage of the invention is to provide an improved connector of the choke and kill lines between the blow out protector and the LMRP.

Another advantage of the invention is to provide a connection to a surface BOP without large structures to hold the parting forces when pressured as per a normal connection.

Another advantage of the invention is to provide a connector that eliminates parting forces at the connection and eliminates side loading on the side outlets of the BOP.

Another advantage of the invention is to provide a connector for flow lines on a subsea production tree.

A further advantage of the invention is to provide a connection that is adapted to extend and retract if necessary.

In accordance with a preferred embodiment of the invention, there is shown a choke and kill line connector having a male stab insertable into a BOP receptacle with a fluid path therebetween, the mounting of the stab is with bolts to the weld prep, which is in turn mounted to the Lower Marine Riser Package (LMRP) mounting plate and appropriate ring grooves are provided between the stab and the weld prep with typical seals provided about the stab of dual polypaks or the like.

In accordance with a preferred embodiment of the invention, there is shown a utility line connector assembly having a male stab having a central bore with a port that communicates with a second bore in a receptacle where said stab is fixedly inserted into a receiving female opening in said receptacle, a receptacle having a L shaped opening with a protruding partial spherical pocket, a ring groove for sealing the stab to a riser package wherein the stab and receptacle are placed between a lower marine riser and the blow out preventer in fluid communication therebetween.

In accordance with a preferred embodiment of the invention, there is shown s utility line connector assembly having a longitudinal member having a central bore inserted into a mating opening in a receptacle, the opening is in fluid communication with an L shaped bore in the receptacle with a protruding partial spherical pocket at the bend of the L, wherein the member and receptacle are in fluid communication therebetween.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
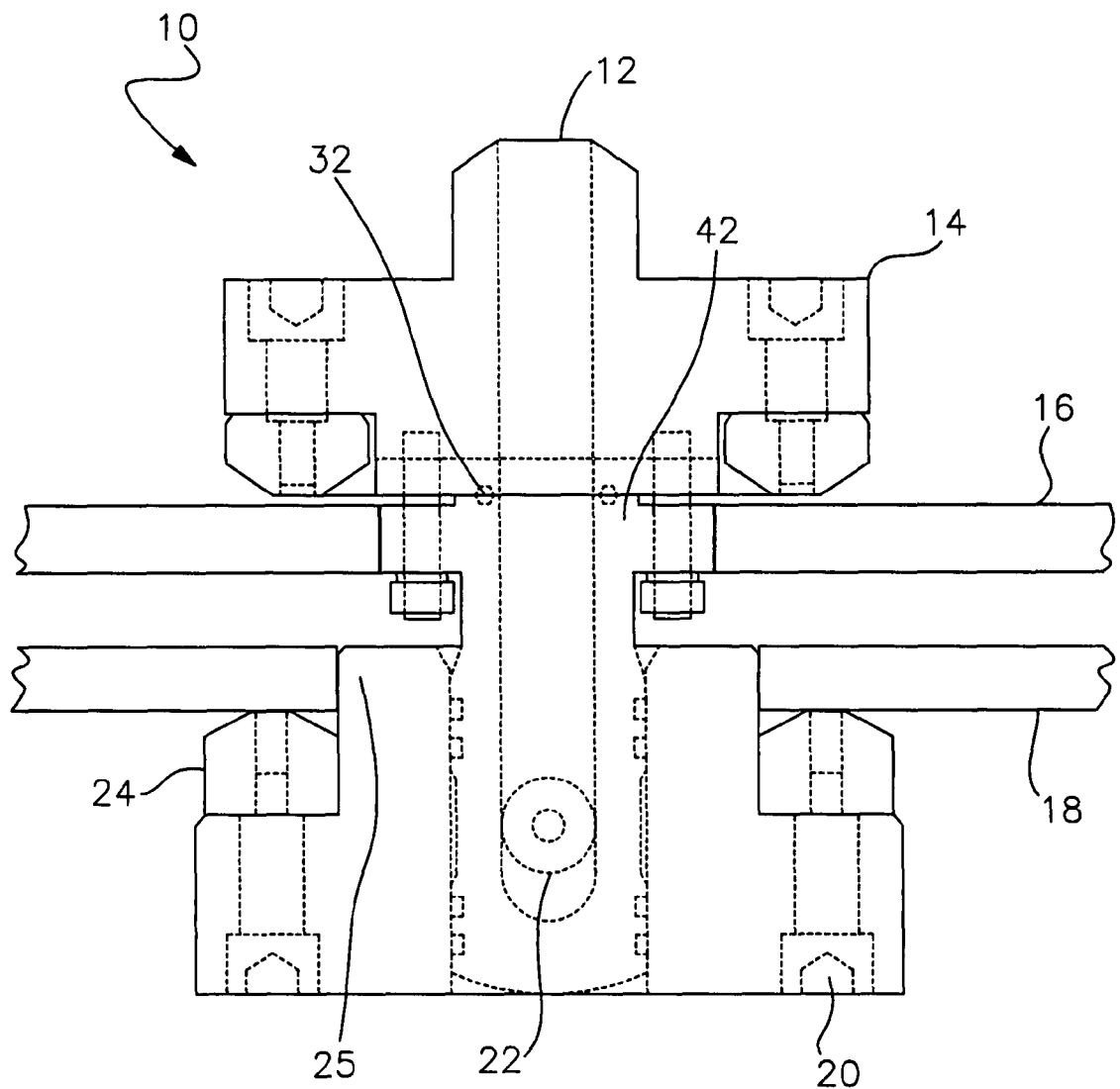
FIG. 1 is a cross sectional view of a choke and kill stab for insertion into a blow out preventer line.
Figure 2:
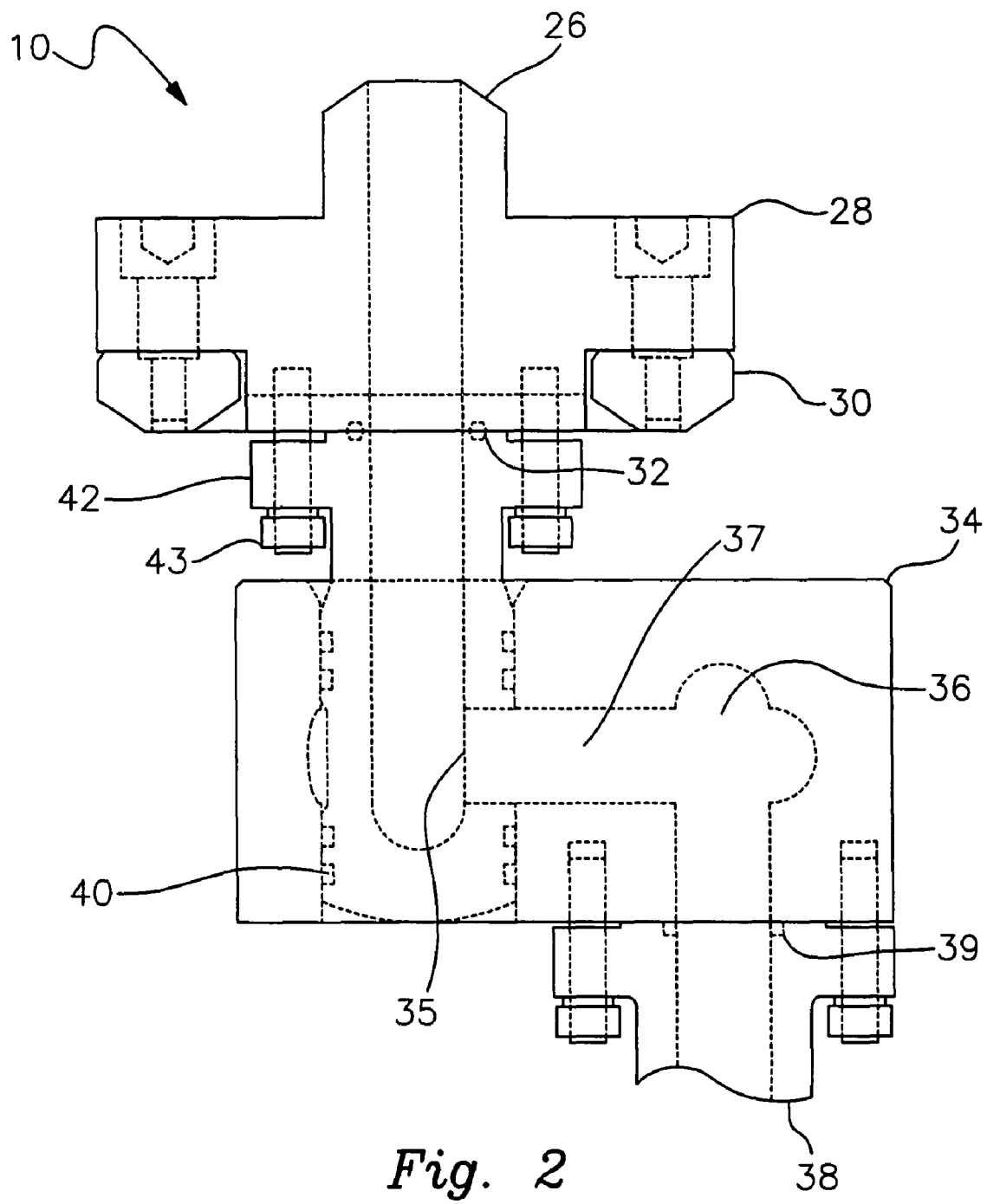
FIG. 2 is a side cross sectional view of a choke and kill stab for insertion into a blow out preventer line.

FIGS. 1 and 2 show the cross sectional view of a connector positioned between the lower main riser package and the blow out preventer in a pipeline. FIG. 1 shows connector assembly 10 with stab 42 of the present invention. In a preferred embodiment, connector assembly 10 is to connect the choke and kill lines between an LMRP (Lower Marine Riser Package) and the BOP (Blow Out Preventer). Flange 14 is mounted to LMRP plate 16. Flange 14 is attached to stab 42 with a ring groove 32 placed therebetween. In a preferred embodiment, the ring groove is a 6BX. Stab 42 is inserted into receptacle 25 and has a bored out center through passage 12. Stab 42 has port 22 (also shown as opening 35 in FIG. 2) that communicates with L shaped bore 37 to spool 38 which goes to valves, not shown. Bore 37 has a partially spherical fluid cushion 36 which receives impact from fluid flow to lessen pressures in the system during potential blow out events. Stab 42 may also be used as a connection for the choke and kill lines to a surface BOP without large structures to hold the parting forces when pressured as per a normal connection.

FIG. 2 shows a cross sectional view of the stab inserted into the BOP receptacle with a fluid path therebetween. Stab 42 is mounted with bolts 43 to the weld prep 26 which is in turn mounted to the LMRP mounting plate 16 shown in FIG. 1. A 6BX ring groove 32 is shown between stab 42 and weld prep 26 mounted on the LMRP mounting plate 30. Seals 40 are provided about stab 42, preferably dual POLYPAKS® or the like. Another 6BX ring groove 39 is provided at the junction between the receptacle 34 and spool 38 to the valves not shown. Sizes and dimensions shown herein are for a preferred embodiment and in actual practice may take on many variations and still use the advantages of the invention. A fluid cushion 36 is bored into the fluid path 37 between stab 42 and spool 38 to the valves.

Figure 3:
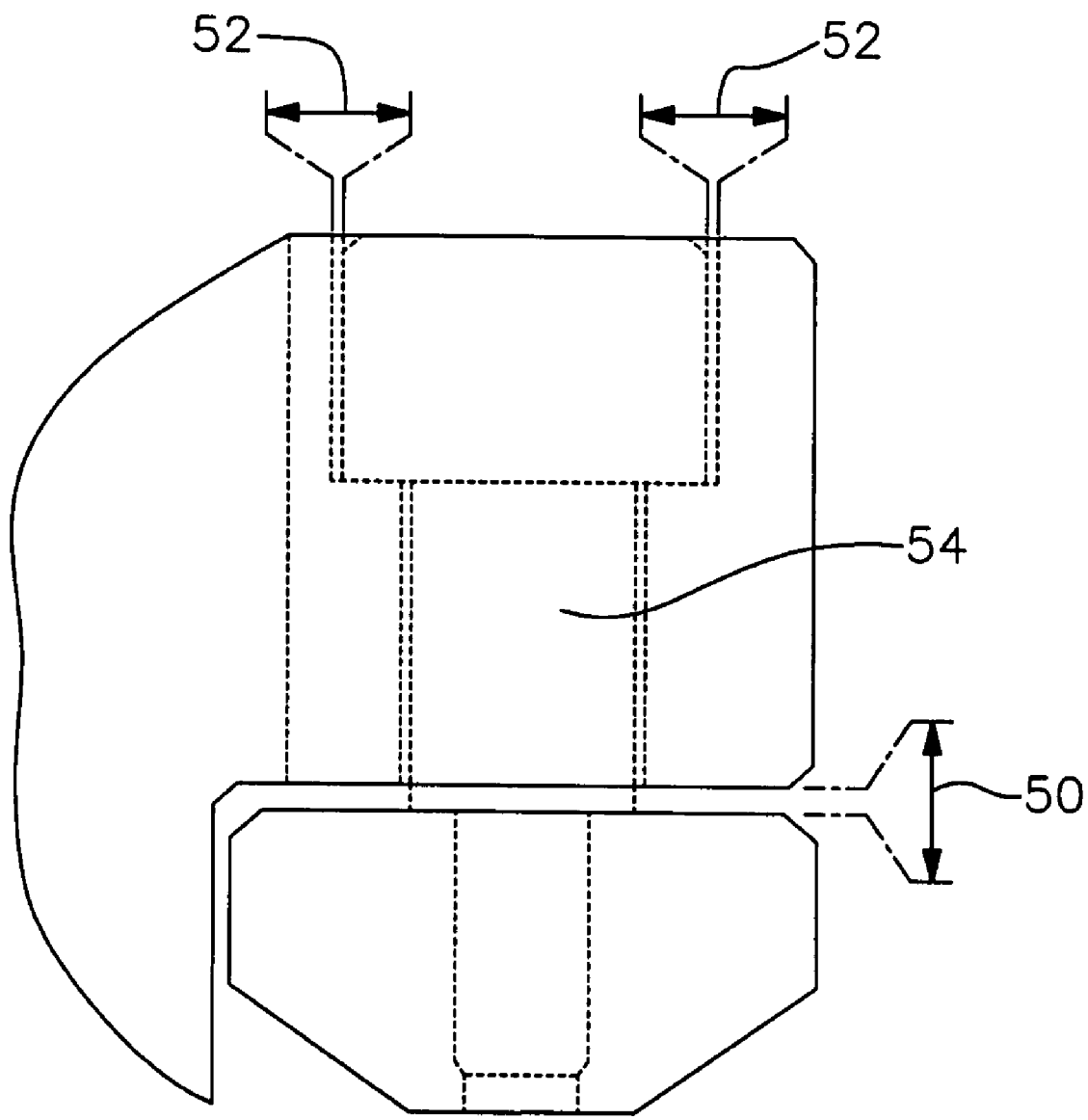
FIG. 3 is a cross sectional view of the float between the receptacle and the BOP receptacle mounting plates.

FIG. 3 shows a cross sectional view of the float between the receptacle and the BOP receptacle mounting plates with shoulder screws 54 having gap 52 to allow float 50. A typical gap 52 is approximately 0.094 inches about the shoulder screw and 0.184 inches at float 50 between the BOP receptacle mounting plates and the receptacle. Gap size described is for illustrative purposes only and may be of any of a variety of sizes depending on the application and not depart from the essential elements of the invention.

The configuration shown in the foregoing figures eliminates parting forces at the connection and eliminates side loading on the side outlets of the BOP. These loads can become so great as to break apart the connection causing significant downtime. Largely due the innovative configuration of the present invention, the male stab can be replaced without removing any of the upper pipework on the LMRP. For similar reasons, the unit can be adapted to extend and retract if desired.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the issued claims.

I claim:

1. A utility line connector assembly comprising:
   a. a male stab having a central bore with a port that communicates with a second bore in a receiving assembly where said stab is fixedly inserted into a receiving female opening in said receiving assembly;
   b. said receiving assembly having an L shaped bore with a protruding partial spherical pocket at the bend of the L to lessen the pressure of fluid flow therethrough;
   c. a ring groove for sealing said stab to a riser package;
   d. wherein said stab and receiving assembly are placed between a lower marine riser and a blow out preventer in fluid communication therebetween.

2. The utility line connector assembly as claimed in claim 1 further comprising seals about the female opening.

3. The utility line connector assembly as claimed in claim 2 wherein said seals are ring seals.

4. A utility line connector assembly connected to a low marine riser and a blow out preventer comprising:
   a. a longitudinal member having a central bore inserted into a mating opening in a receiving assembly;
   b. said opening in fluid communication with an L shaped bore in said receiving assembly with a partial spherical pocket at the bend of the L to lessen the pressure of fluid flow therethrough;
   c. wherein said member and receiving assembly are in fluid communication therebetween.

5. The utility line connector assembly as claimed in claim 4 wherein the member and receptacle are placed between the lower marine riser and the blow out preventer in fluid communication therebetween.

6. The utility line connector assembly as claimed in claim 4 further comprising v-shaped grooves with ring seals placed therein.

7. A utility line connector assembly connected to a low marine riser and a blow out preventer comprising:
   a. a tube inserted into a reciprocal opening in a receptacle;
   b. said tube having a port in fluid communication with an L shaped bore in said receptacle having a protruding partial spherical pocket at the bend of the L to lessen the pressure of fluid flow therethrough;
   c. wherein said tube and receptacle are in fluid communication therebetween.

8. The utility line connector assembly as claimed in claim 7 wherein the tube and receptacle are placed between the lower marine riser and the blow out preventer in fluid communication therebetween.

9. The utility line connector assembly as claimed in claim 7 further comprising seals about the reciprocal opening.

10. A utility line connector assembly as claimed in claim 9 wherein said seals are ring seals.

11. A utility line connector assembly as claimed in claim 9 wherein said seals are v-shaped grooves with ring seals placed therein.

* * * * *